Figure 1:
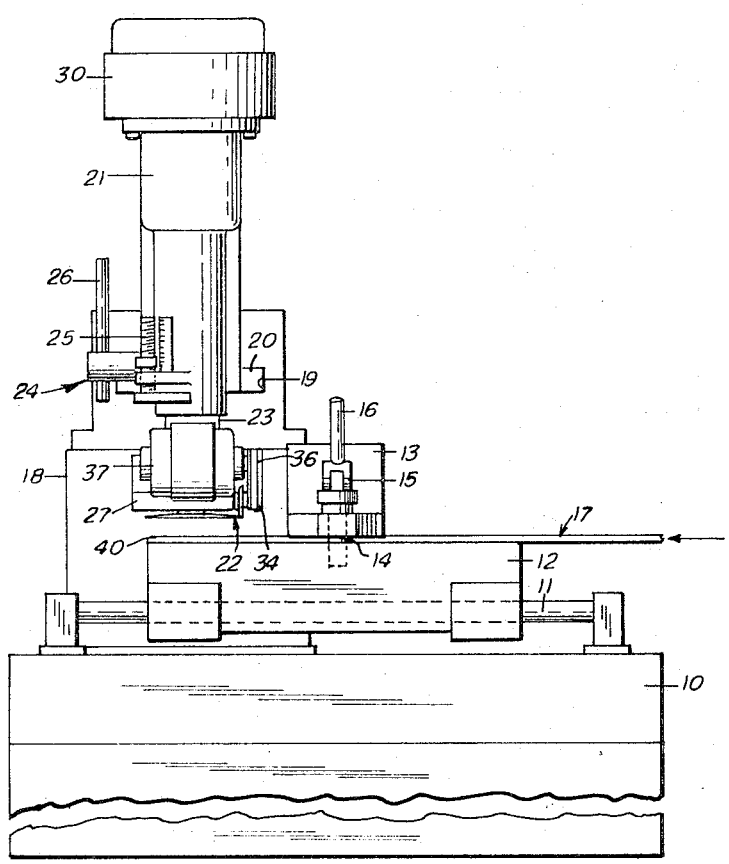

Feb. 20, 1968    I. O. JOHANSSON    3,369,433
APPARATUS FOR CUTTING TRANSVERSE NOTCHES IN A BELT END
Filed July 22, 1964    4 Sheets-Sheet 1

INVENTOR
INGVAR O. JOHANSSON

By Fisher, Christen, Sabal and Caldwell
ATTORNEYS

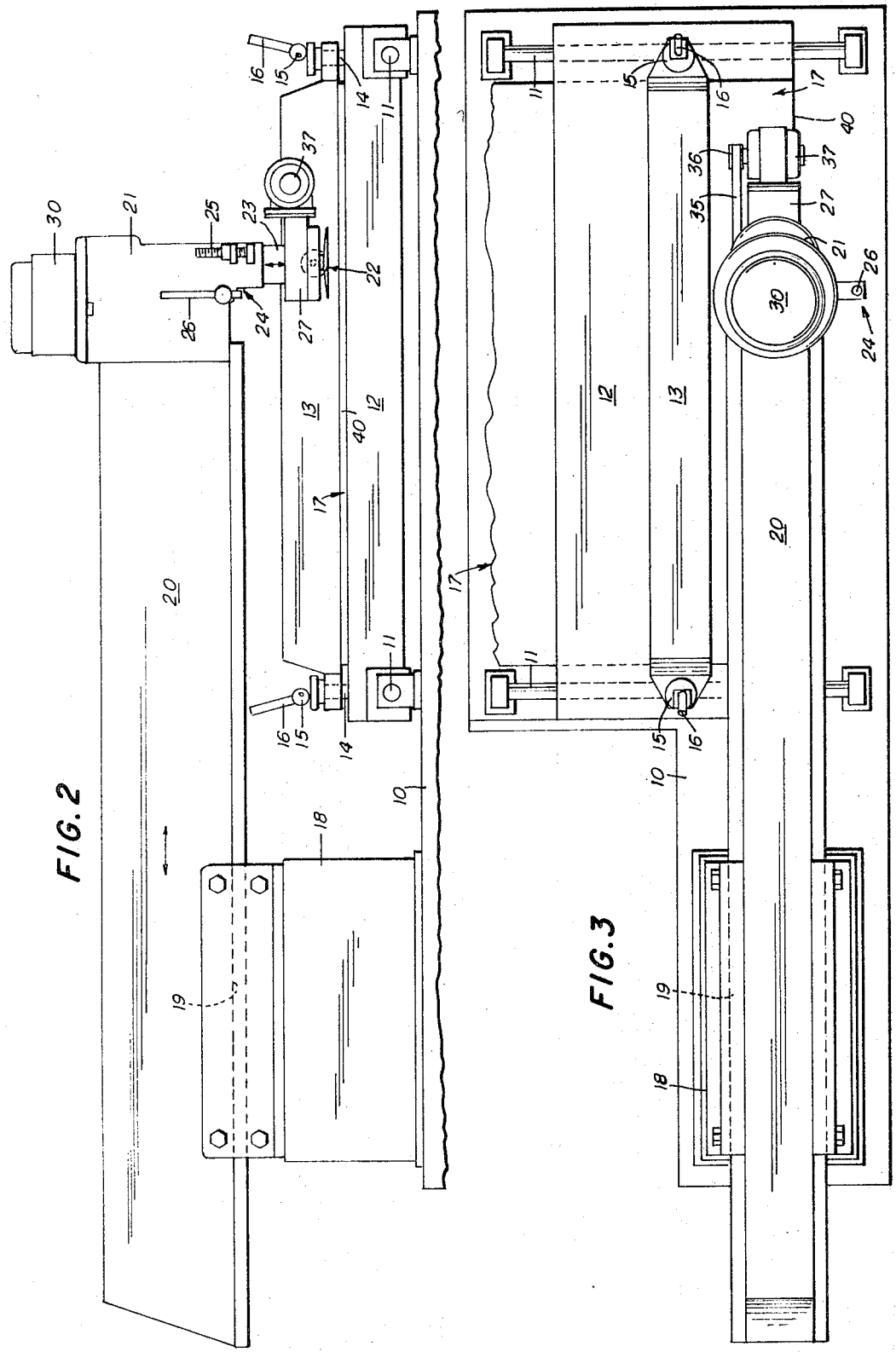

United States Patent Office 3,369,433
Patented Feb. 20, 1968

3,369,433
APPARATUS FOR CUTTING TRANSVERSE
NOTCHES IN A BELT END
Ingvar O. Johansson, Skokie, Ill., assignor, by mesne assignments, to Burrell Belting Company, Skokie, Ill., a corporation of Illinois
Filed July 22, 1964, Ser. No. 384,347
5 Claims. (Cl. 83—3)

This invention relates to power-operated tools, and more particularly to a power-operated cutting means for preparing the ends of flat belting material which are to be joined together to form an endless belt.

Certain types of flat, continuous belts are formed from lengths of flat belting material by joining their ends to form a continuous loop. If the ends are merely cut off at right angles and butted together, it is necessary to lace the ends together or to provide a metal fastener to join them. However, these fastenings are unsatisfactory when it is desired to provide a belt having an endless smooth surface.

One well-known method of forming continuous belts having smooth, uninterrupted surfaces at their joints is to prepare the ends by cutting a series of vertically and longitudinally staggered steps, or notches, in the respective ends after which the ends are superimposed and secured together in overlapping relationship. In the past, these stepped portions have had to be cut by hand, which is a time-consuming operation.

In the present invention, the preparation of belt ends of this type has been greatly simplified by the provision of a machine carrying a pair of rotary power-operated knives positioned on axes disposed at right angles to each other, with the peripheries of the two knives touching at one point, so that the steps in the belt ends may be cut by a single transverse movement of the coacting knives.

One object of the invention is to provide apparatus having a pair of power-operated knives mounted at right angles to each other and supported on a movable carriage so as to cut a transverse notch in the end of a belt.

Another object of the invention is to provide apparatus having a pair of power-operated knives for cutting transverse notches in a belt end in which the thickness of the notches may be precisely controlled.

A further object of the invention is to provide apparatus having a pair of power-operated knives movable transversely of a belt, wherein means is provided to securely hold a belt and to advance it in a longitudinal direction for successive operations by the knives.

Still another object of the invention is to provide a pair of angularly disposed power-operated rotary cutters, arranged to be driven by a single motor, yet being adjustable with respect to each other whereby the peripheral cutting edges of the knives may always be positioned in tangential relationship to each other despite variations in their diameter because of wear or repeated sharpening.

Figure 4:
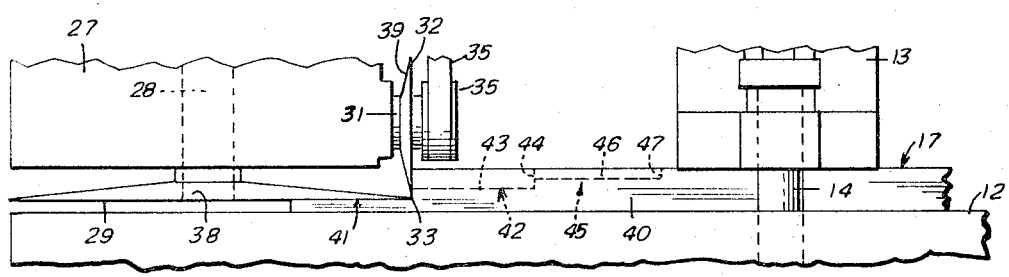
Figure 5:
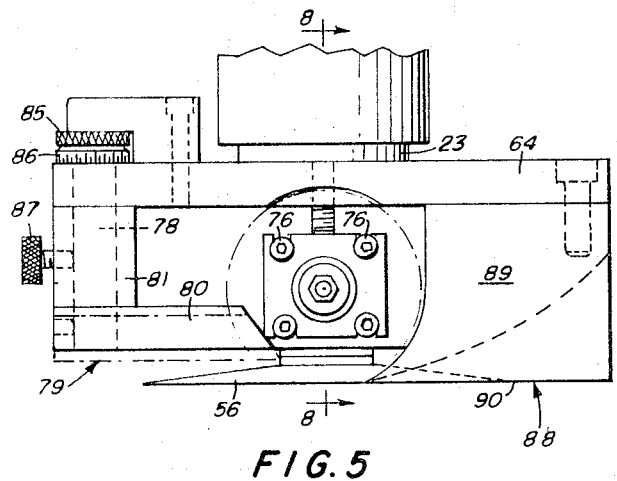
Figure 6:
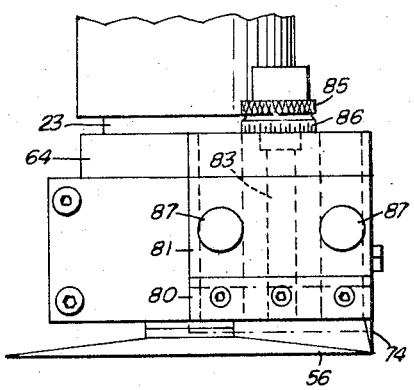
Figure 7:
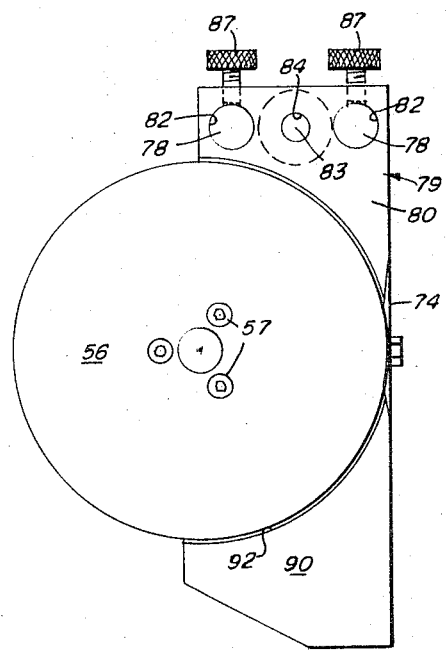
Figure 8:
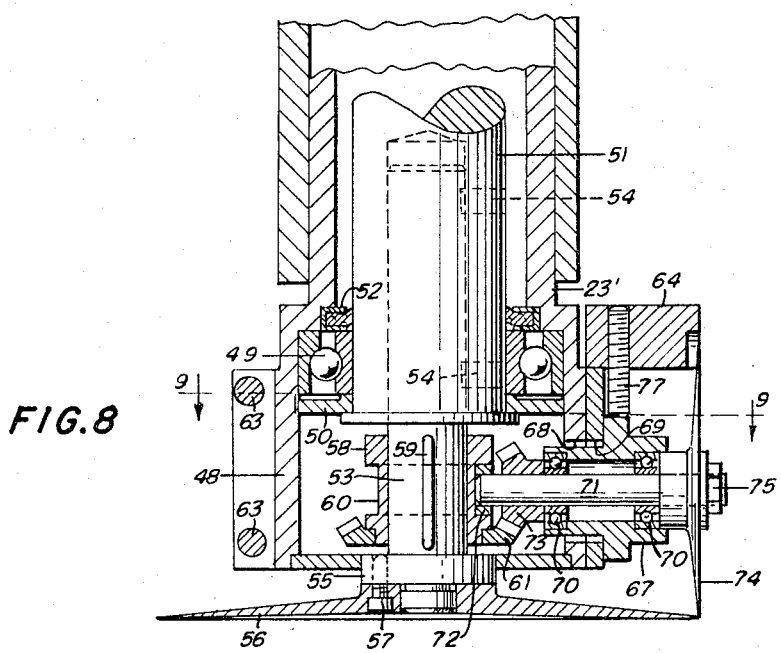
Figure 9:
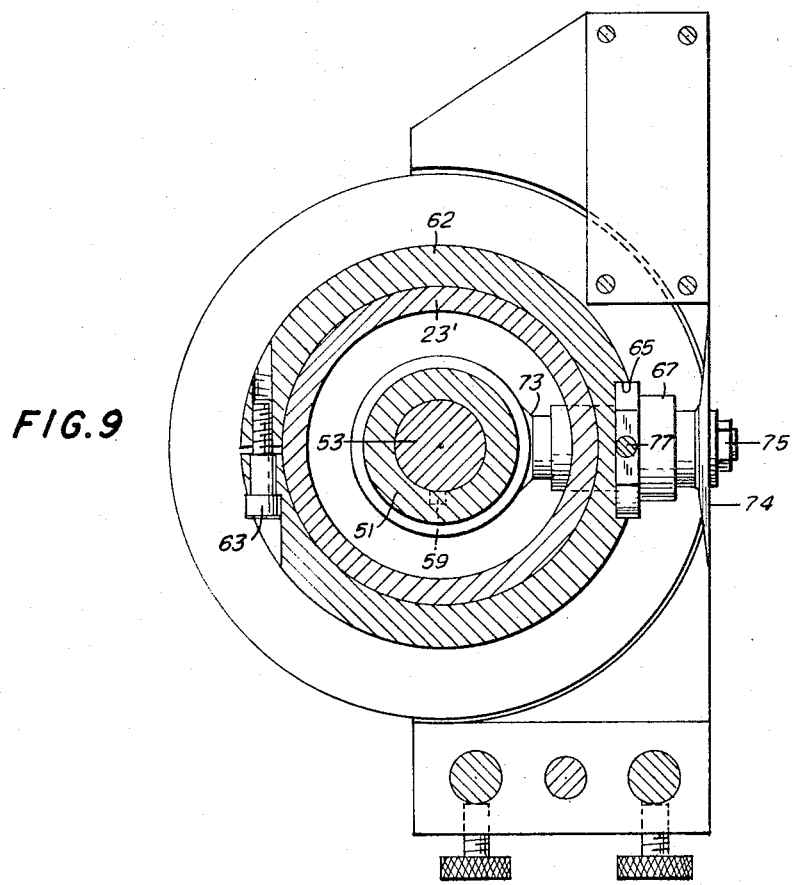

Other objectives will be apparent to those skilled in the art after reading the foregoing specification in connection with the annexed drawings; in which FIGURE 1 is a side elevation of one form of apparatus constructed in accordance with this invention; FIGURE 2 is a front elevation of the same; FIGURE 3 is a plan view; FIGURE 4 is a fragmentary side elevation of the cutting means operating on the ends of a belt; FIGURE 5 is a side elevation of a modified form of cutter head on an enlarged scale; FIGURE 6 is an end elevation of the cutter head shown in FIGURE 5 as viewed from the left; FIGURE 7 is a bottom view of the same; FIGURE 8 is a vertical cross-section taken on line 8—8 of FIGURE 5, and; FIGURE 9 is a horizontal cross-section taken on the line 9—9 of FIGURE 8.

Referring now to the drawings in detail, the numeral 10 indicates a base upon which is mounted a pair of parallel horizontal rails 11 which support a belt carrying table 12 for limited reciprocatory movement in a straight horizontal path. A transverse clamp 13, extending over substantially the entire width of the table, is positioned medially the ends of the table. The clamp is supported for limited vertical movement on a pair of posts 14, and vertically adjustable camming mechanisms 15, having operating handles 16, are secured to the upper ends of the posts to enable a belt, indicated generally by numeral 17, to be releasably held between the clamp 13 and the flat surface of the table 12.

Located at one side of the table 12 is a heavy pedestal 18 mounted on the base 10 which, in turn, is provided with a horizontally disposed guideway 19 which slideably supports a beam 20 for horizontal reciprocatory movement in a straight path at right angles to the path of movement of the belt carrying table. Housing 21 is attached at one end of the beam 20 to support a cutter means, indicated generally by numeral 22.

The cutter means 22 includes a column 23 which is vertically slideably received within the hollow interior of the housing 21. An adjusting means, indicated generally by numerical 24, enables the vertical spacing between the cutter means 22 and the table 12 to be accurately maintained at any predetermined value. Such adjustment means are well known in the art and may include a visual scale 25 and a locking clamp 26.

The lower end of the column 23 is provided with a bracket 27 which contains the lower end of a bearing (not shown) having a vertically extending shaft 28. A generally dish-shaped rotary cutter 29 is secured in a horizontal position at the lower end of shaft 28. Power is supplied to the shaft by means of an electric motor 30 mounted on top of the housing 21 and connected with the shaft 28 by means of any suitable telescopic drive connection (not shown) which will permit relative vertical movement of the cutter 29 with respect to the column 23.

The bracket 27 is also provided with suitable bearings (not shown) for supporting a stub shaft 31 on a horizontal axis parallel with the path of movement of the table 12, and also intersecting the axis of shaft 28. A second dish-shaped rotary cutter 32, of somewhat smaller diameter than the first cutter, is attached to shaft 31 in a vertical plane so as to position the peripheral edges of the cutter tangent to each other at the point indicated by numeral 33. Shaft 31 is also provided with a pulley 34 to receive a driving belt 35 for driving connection with a pulley 36 of a second electric motor 37 mounted on one end of the bracket 27.

It should be noted that the convex surface 38 of the cutter 29 is positioned uppermost while the conical surface 39 of cutter 32 is positioned adjacent the convex surface of the first cutter.

In operation the cutter means 22 should first be moved out of the way by sliding the beam 20 to the left (as viewed in FIGURE 2). The belt table 12 should also be placed in an accessible position by moving it as far to the right as possible (as viewed in FIGURE 1). After the clamp 13 is loosened, by releasing the manually-operated handles 16, the end portion 40 of the belt may be placed on the table forwardly of the clamp 13 and secured in this position by downward movement of the handles 16. The vertical position of the cutter 29 is then set at the desired height by means of the adjusting means 24. The length of the step, or notch, cut in the belt will be determined by the relative position of the table 12 with respect to cutter 32 and the table should next be set to provide the required length of the step, as will be seen in FIGURE 4.

These two adjustments having been made the motors 30 and 37 are turned on and the cutter means 22 is moved transversely across the table. During the course of travel the knife edges of the two cutters will remove a rectangular cross-section of the belting material lying above blade 29 and forwardly of blade 32, as will be seen in FIGURE 4. After the first notch has been cut, the cutter 22 is moved back across the table and out of the way and raised slightly to provide the proper thickness for the second step, or notch 42. The table 12 is again moved forwardly a distance sufficient to provide the proper length of the second notch, and the cutter may then be moved transversely across the belt in the same manner as was done in making the first notch 41, the material removed in this operation being represented by the portion defined by the dotted lines 43 and 44 in FIGURE 4.

The cutter having again been returned to the retracted position (toward the left in FIGURE 2) and the heights of the cutters and the position of the table having again been adjusted a third notch 45 may be made by removing the material defined by dotted lines 46 and 47.

It will be noted that because of the dish-shape configuration of the cutter 29 and 32 and the positioning of their convex surfaces adjacent to each other that a flat horizontal and vertical surface is produced on each step in the belt. This is true because the concave surface of the respective blades form recesses within which supporting bolts may be recessed sufficiently so that they do not project beyond the plane of the peripheral edges. It will also be observed that while only three steps or notches have been shown in the drawing any desired number of such notches could be made depending on the thickness of the belt.

A modified form of cutter head, wherein a single motor is adapted to drive both cutter blades, is shown in FIGS. 5-9. In this modified form the lower end of the vertically movable column 23' terminates in a cylindrical shroud 48 of somewhat larger diameter than the upper portion of the column. A radial anti-friction bearing 49 is contained within the upper portion of this shroud, as by means of a threaded retaining ring 50. This bearing supports the lower end of a shaft 51 which is driven by the motor 30 through a telescopic coupling (not shown) and a flexible seal 52 may be provided above the bearing 49. The lower end of shaft 51 is provided with an axial bore to removably receive a quill 53 which is held in place by set screws 54. The lower end of the quill is provided with a boss 55 to which the horizontal rotary knife 56 is attached by means of threaded cap screws 57.

Positioned above the boss on the quill 53 is a collar 58, which is slidable on the quill but secured for a rotation with it by means of splines 59. The collar is provided with an annularly extending inwardly directed channel 60 and has fixedly secured to its lower end a bevel gear 61.

Surrounding the exterior of the shroud 48 is a split cylindrical housing 62 which is clamped in place by means of cap screw 63. On the rear side of the machine a horizontally extending supporting plate 64 is secured to the upper radial periphery of the split housing, as by means of welding. Also on the rear side of the machine the circumferential portion of the housing 62 is provided with a flat vertically extending recess, or channel 65, to receive a vertically adjustable mounting plate 66. This plate has integrally formed with it a horizontally extending tubular portion, one end of which extends inwardly through suitable openings 68 and 69 provided respectively in the shroud and the split housing. Positioned within the tube are a pair of anti-friction bearings 70 for supporting a short horizontal shaft 71. One end of the shaft is provided with bushing 72 which rides in the channel 60 and thus holds the collar 58 in vertical alignment to maintain engagement between a bevel gear 73 secured to shaft 71 and the bevel gear 61. The other end of the saft 71 supports the vertical knife 74 which can be horizontally adjusted on the shaft by means of a threaded nut. Vertical adjustment of the knife 74 can be provided by upward and downward movement of the plate 66 which is attached to the housing by means of cap screws 76 passing through vertically slotted openings in the plate. Fine adjustment of the position of the plate can be assisted by the provision of the threaded set screw 77 carried by the horizontal plate 64.

At the left hand end of the supporting plate 64 (as viewed in FIG. 5) a pair downwardly directed horizontally spaced parallel guide rods 78 are mounted. These rods support a vertically adjustable depth guide means, generally indicated by numeral 79, which comprises a horizontal sole plate 80, having a upwardly extending leg 81 at one end, this leg having a pair of apertures 82 enabling the depth guide to slide freely up and down on the rods 78. A threaded member 83 has its upper end journaled in the plate 64 while its lower end engages a threaded passage 84 in the leg 81. The threaded member is provided with an operating knob 85 having a scale 86 for precise adjustment of the relative position of the depth guide. Once having been set, the position of the guide can be maintained by means of set screws 87.

A plow means, indicated generally by numeral 88, is attached to the underside of the plate 64 on the right hand side, as viewed in FIG. 5. This may comprise a block of metal 85 having a lower horizontal surface 90 in alignment with the cutting edge of the horizontal blade 56 with the interior of the block formed with an arcuately upwardly sloping surface 91. This sloping surface merges with the lower surface 90 in a relatively sharp cylindrical edge 92, spaced closely adjacent the periphery of the knife 56, and may be described as the leading edge of the plow means.

In operation, it will be understood that the belt 17 will be placed on the table 12 under the clamp 13 and that the beam 20 will first be positioned to place the cutter head on the left hand side of the table as viewed in FIGS. 2 and 3. With this modified form of cutter the depth of the notches or steps in the end of the belt can be determined by the vertical positioning of the sole plate 80. However, the uppermost cut, or step, 45 will be made first by bringing the sole plate down upon the top of the belt and moving the beam holding the cutter mechanism towards the right, as viewed in FIG. 2. As the cutters 56 and 74 move across the belt a slice of belting is removed and picked up by the leading edge to the plow means 88 following behind them. After the notch 45 has been made the cutter is returned to its original position and the table is moved towards the right, as viewed in FIG. 4, after which the cutter is brought into position and the knives again lowered so that sole plate 80 now rests on the material of the belt which is left after the first cut. The second notch 42 may then be cut by moving the cutter head across the belt as before. Successive notches, or steps, can be cut by repeating the previously described operation.

Having disclosed two forms in which the invention may be practiced it will be understood that various modifications may be made in the construction of the invention which would fall within the scope of the annexed claims.

I claim:

1. In a device of the character described a base, a flat belt supporting table mounted on the support for horizontal reciprocatory movement in a straight path, a belt clamping bar extending across the width of the table, a horizontally elongated arm mounted on the support for horizontal reciprocatory movement in a straight path at right angles to said first straight path, a belt cutting means, vertically adjustable means for supporting said cutting means at one end of said arm said belt cutting means including a dish-shaped rotary knife mounted above the plane of the table on an axis at right angles to the surface thereof, a second dish-shaped rotary knife mounted on an axis parallel with the path of movement of the table and intersecting the axis of the first rotary knife, said knives being also positioned with their peripheries tangent to each other at one point, the convex surfaces of said knives being disposed adjacent each other, whereby when the end of a belt is clamped on said table a succession of vertically and horizontally offset transverse notched portions may be cut and removed at the end of the belt.

2. In a belt cutting tool, a first shaft having a first rotary cutting wheel fixed thereon, a second shaft having a second rotary cutting wheel fixed thereon, a housing reciprocatively movable in the direction of the axis of one of the shafts, said one shaft being rotatably mounted on said housing and axially fixed with respect thereto, said second shaft being rotatably mounted on said housing in angular relationship to the first shaft and movable with respect to the housing in a direction normal to its axis of rotation, whereby the periphery of the second cutting wheel may be positioned tangentially to the plane of the first cutting wheel, and drive transmitting means connecting said shaft whereby said second shaft is rotated by said first shaft.

3. The invention as defined in claim 2, wherein said drive transmitting means comprises a pair of gears respectively fixed on each of said two shafts, and means maintaining said gears in meshing engagement.

4. The invention as defined in claim 2, wherein said last-mentioned means comprises a collar on said one shaft, one of said gears being axially fixed with respect to said collar, and means for maintaining said collar in alignment with the axis of the second shaft.

5. The invention as defined in claim 4, wherein said collar is provided with an annular channel, one end of the second shaft being slidably received in said channel.

References Cited
UNITED STATES PATENTS

| | | | |
|---|---|---|---|
| 2,803,869 | 8/1957 | Brauchler | 83—3 |
| 3,156,147 | 11/1964 | Linn et al. | 83—5 |
| 3,170,356 | 2/1965 | Lygo | 83—496 |

ANDREW R. JUHASZ, *Primary Examiner.*

WILLIAM W. DYER, Jr., *Examiner.*